US008178255B2

(12) United States Patent
Nishikawa et al.

(10) Patent No.: US 8,178,255 B2
(45) Date of Patent: May 15, 2012

(54) FUEL CELL

(75) Inventors: Masato Nishikawa, Moriguchi (JP);
Tatsuyuki Nakagawa, Moriguchi (JP);
Hitoshi Kihara, Moriguchi (JP)

(73) Assignee: SANYO Electric Co., Ltd., Moriguchi (JP)

( * ) Notice: Subject to any disclaimer, the term of this patent is extended or adjusted under 35 U.S.C. 154(b) by 375 days.

(21) Appl. No.: 12/525,698

(22) PCT Filed: Jan. 31, 2008

(86) PCT No.: PCT/JP2008/051495
§ 371 (c)(1),
(2), (4) Date: Aug. 4, 2009

(87) PCT Pub. No.: WO2008/096657
PCT Pub. Date: Aug. 14, 2008

(65) Prior Publication Data
US 2010/0028739 A1 Feb. 4, 2010

(30) Foreign Application Priority Data

Feb. 6, 2007 (JP) ................................. 2007-027107
Jan. 23, 2008 (JP) ................................. 2008-013128

(51) Int. Cl.
*H01M 8/10* (2006.01)
*H01M 8/04* (2006.01)
*H01M 2/38* (2006.01)
(52) U.S. Cl. ......... 429/465; 429/443; 429/444; 429/455
(58) Field of Classification Search .................. 429/443, 429/444, 450, 454, 455, 456, 457, 458, 465, 429/490
See application file for complete search history.

(56) References Cited

U.S. PATENT DOCUMENTS

2003/0143444 A1* 7/2003 Liu et al. ......................... 429/19
(Continued)

FOREIGN PATENT DOCUMENTS

EP        0867963 A2    9/1998
(Continued)

OTHER PUBLICATIONS

T. Kamakura, et al.; "Acoustic Streaming and Radiation Pressure", The Institute of Electronics, Information and Communication Engineers, Jan. 1997, pp. 31-38, US 96-93, EA96-97.

(Continued)

*Primary Examiner* — Jerry Lorengo
*Assistant Examiner* — Carlos Barcena
(74) *Attorney, Agent, or Firm* — Westerman, Hattori, Daniels & Adrian, LLP

(57) ABSTRACT

Fuel cell of this invention generates electricity by supplying fuel fluid to one of a pair of electrodes forming an MEA 1, supplying oxidation fluid to the other electrode, at least one of the fuel and oxidation fluids being gas, comprising a gas supply device transferring the gas along a flow path 10 defined on a surface of the MEA 1 and a drive circuit driving the gas supply device comprising a vibrating plate 4 and a reflection wall on both sides of the flow path 10, and the drive circuit performs a normal operation control generating gas flow from inlet to outlet of the flow path 10 due to sound pressure gradient generated in the flow path 10 by vibrating the vibrating plate 4 and a foreign material elimination operation control eliminating foreign material in the flow path 10 by changing a vibration mode of the vibrating plate 4.

9 Claims, 10 Drawing Sheets

U.S. PATENT DOCUMENTS

2005/0282047 A1 * 12/2005 Kimura et al. .................... 429/4
2006/0172174 A1 * 8/2006 Son et al. ........................ 429/34

FOREIGN PATENT DOCUMENTS

| JP | 10326622 A | * | 12/1998 |
| JP | 2000-120600 A | | 4/2000 |
| JP | 2000186699 A | | 7/2000 |
| JP | 2002184430 A | * | 6/2002 |
| JP | 2004022399 A | * | 1/2004 |
| JP | 2004103277 A | | 4/2004 |
| JP | 2006228507 A | | 8/2006 |
| JP | 2006344461 A | | 12/2006 |
| WO | WO 2007049756 A1 | * | 5/2007 |

OTHER PUBLICATIONS

H. Mitome, "On the Generation Mechanism of Acoustic Streaming", pp. 1614-1620, Oct. 1997, vol. J80-A, No. 10.

International Search Report of PCT/JP2008/051495, Mailing Date of Apr. 1, 2008.

* cited by examiner

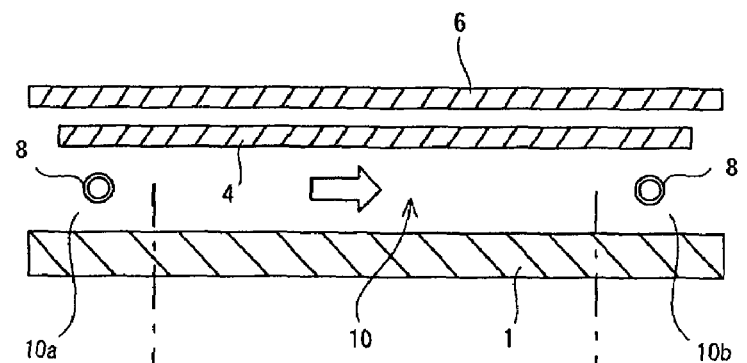
FIG. 3(a)
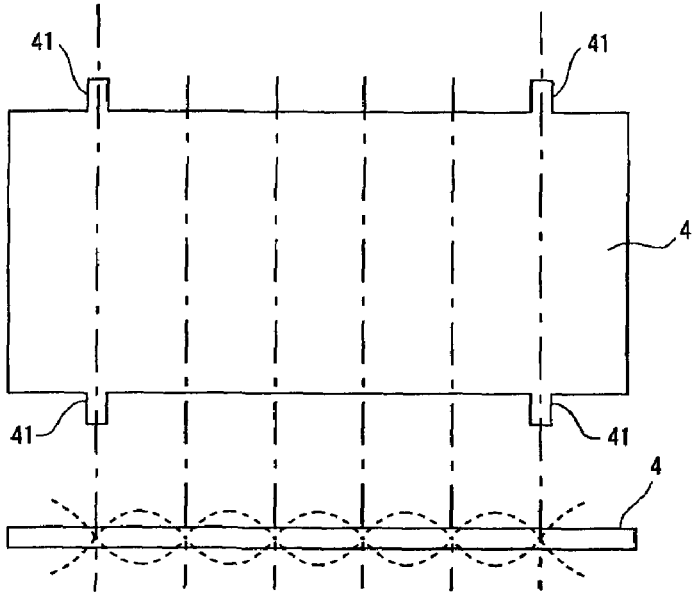
FIG. 3(b)
FIG. 3(c)

FIG.12(a)

| NUMBER OF NODES | WAVELENGTH λ [mm] | FREQUENCY [kHz] |
|---|---|---|
| 2 | 50.0 | 3.6 |
| 3 | 33.3 | 8.2 |
| 4 | 25.0 | 14.5 |
| 5 | 20.0 | 22.7 |
| 6 | 16.7 | 32.6 |
| 7 | 14.3 | 44.4 |
| 8 | 12.5 | 58.0 |
| 9 | 11.1 | 73.4 |
| 10 | 10.0 | 90.6 |
| 11 | 9.1 | 109.7 |
| 12 | 8.3 | 130.5 |
| 13 | 7.7 | 153.2 |
| 14 | 7.1 | 177.7 |
| 15 | 6.7 | 203.9 |

FIG.12(b)

| NUMBER OF NODES | WAVELENGTH λ/2 | FREQUENCY kHz |
|---|---|---|
| 0.0 | 60.0 | 0.6 |
| 1.0 | 30.0 | 2.5 |
| 2.0 | 15.0 | 10.1 |
| 3.0 | 10.0 | 22.7 |
| 4.0 | 7.5 | 40.3 |
| 5.0 | 6.0 | 62.9 |
| 6.0 | 5.0 | 90.6 |
| 7.0 | 4.3 | 123.4 |
| 8.0 | 3.8 | 161.1 |
| 9.0 | 3.3 | 203.9 |

FUEL CELL

FIELD OF THE INVENTION

The present invention relates to fuel cells comprising a membrane electrode assembly, and particularly to a fuel cell capable of eliminating foreign material such as liquid produced by the membrane electrode assembly as by-product or dust.

DESCRIPTION OF RELATED ART

Fuel cells have high energy conversion efficiency and do not generate any harmful materials in the power generation reaction, and therefore, have attracted attention as an energy source for a variety of electric devices.

FIG. 14 shows a particular configuration of a unit cell constituting the fuel cell, in which an air pole 12 and a fuel pole 13 are disposed on both sides of an electrolytic membrane 11 to constitute a membrane electrode assembly (hereinafter referred to as MEA) 1. An air pole side electrically conductive plate 14 provided with a plurality of air supply grooves 19 recessed therein is disposed over a surface of the air pole 12 constituting the MEA 1, and a gas separator 16 is further disposed outside the electrically conductive plate 14. Also, a fuel pole side electrically conductive plate 17 provided with a plurality of fuel gas supply grooves 18 recessed therein is disposed over a surface of the fuel pole 13 constituting the MEA 1.

In the fuel cell described above, air is sent into the air supply grooves 19 of the air pole side electrically conductive plate 14 as an oxidation gas, while fuel gas is sent into the fuel gas supply grooves 18 of the fuel pole side electrically conductive plate 17 to generate electric power.

In recent years, it has been considered to install fuel cells in small electronic devices as a power source. For example, direct methanol fuel cell (DMFC) which may be made thin is seen as promising. In the DMFC, the oxidation gas such as air or oxygen is supplied to the air pole 12, while a fuel such as methanol is supplied to the fuel pole 13 being maintained in a gas or liquid state to generate electric power.

However, in order to install the fuel cells in small electronic devices, it is required to downsize gas supply devices for supplying an oxidation gas and fuel gas to the air pole 12 or the fuel pole 13.

Conventionally, as a small gas supply device, suggested are a blowing device generating standing wave by means of a plurality of piezoelectric ceramics to transfer air (For example, See Japanese Laid-Open Patent Publication No. 2000-120600), a piezoelectric bimorph fan transferring air based on a similar principle to a fan (For example, See Japanese Laid-Open Patent Publication No. 2000-186699). However, in any of conventional gas supply devices, it is difficult to downsize the devices to such a degree that the devices can be installed in small electronic devices along with fuel cells, and none of them has been put to practical use.

Inventors of the present invention focused on a technique to transfer a gas by utilizing acoustic streaming in a small fuel cell. The acoustic streaming is a stationary fluid flow generated by acoustic field. In the case where, as shown in FIG. 15, a vibrating plate 9 and a reflection plate 91 are disposed oppositely, and vibration is applied to the vibrating plate 9 to generate ultrasonic standing wave, air column resonance is generated between the vibrating plate 9 and the reflection plate 91, and along with this, spiral acoustic streaming is generated between the vibrating plate 9 and the reflection plate 91. Here, the principle of generating the acoustic streaming is reported in several articles (for example, see "Acoustic Streaming and Radiation Pressure" Institute of Electronics, Information and Communication Engineers, TECHNICAL REPORT OF IEICE, US96-93, EA96-97 (1997-01) and "About Generation Mechanism of Acoustic Streaming" Institute of Electronics, Information and Communication Engineers, Journal of Information and Communication Engineers A, Vol. J80-A No. 10 pp. 1614-1620 (October, 1997)).

The inventors of the present invention proactively controlled the acoustic streaming and have been successful to generate uniform flow from an inlet to an outlet along a predetermined flow path, and completed a gas supply device suitable for a small fuel cell.

DISCLOSURE OF THE INVENTION

Problems to be Solved by the Invention

However, in a fuel cell comprising a gas supply device utilizing acoustic streaming, a distance between a vibrating plate and a reflection plate becomes significantly small along with downsizing of the gas supply device. Therefore, left is a problem such that foreign material such as liquid (water) or dust generated in a flow path in which a fuel gas or an oxidation gas flows adversely affects the gas flow to result in a decrease in power generation efficiency.

Means for Solving the Problem

In a fuel cell according to the present invention, a pair of electrodes are disposed on both sides of an electrolyte membrane to form an MEA. Of the pair of electrodes, a fuel fluid is supplied to one electrode and an oxidation fluid is supplied to the other electrode to generate electric power. At least one of the fuel fluid and oxidation fluid is gas, and the fuel cell comprises a gas supply device transferring the gas along a flow path defined on a surface of the MEA, and a drive circuit driving the gas supply device.

The gas supply device comprises a vibrating plate and a reflection wall on both sides of the flow path, and the drive circuit comprises a control circuit performing a normal operation control generating a gas flow from an inlet to an outlet of the flow path due to sound pressure gradient generated in the flow path by vibration of the vibrating plate, and a foreign material elimination operation control eliminating a foreign material in the flow path by changing a vibration mode of the vibrating plate.

In the fuel cell described above, performing of the normal operation control vibrates the vibrating plate, and acoustic wave thereby caused is multiply reflected in the flow path between the vibrating plate and the reflection wall, thereby increasing sound pressure in the flow path. As a result, acoustic streaming arises in the flow path, then a force to transfer the gas in the flow path is generated, and thereby the gas is transferred along the flow path. While the gas moves in the flow path, the fuel gas or oxidation gas is supplied to the electrode of the MEA. Here, in the present invention, "acoustic streaming" is a concept which means a stationary fluid flow generated due to sound pressure gradient of acoustic field.

In the case where foreign material such as liquid produced as by-product or dust has been accumulated in the flow path in operation of the above described normal operation control, the operation is shifted to the foreign material elimination operation control to change, for example, at least either of vibrational frequency and amplitude of the vibrating plate. A vibration mode of the vibrating plate thereby changes and locations of an antinode and a node of vibration generated on the vibrating plate move. Along with this, the foreign material attached to the vibrating plate receives a force in a single direction, and as a result, is captured in the flow path or ejected from the flow path.

In a particular configuration, the drive circuit comprises a sound pressure sensor detecting the sound pressure in the flow path. When a decrease in the sound pressure is detected by the sound pressure sensor, the control circuit shifts from the normal operation control to the foreign material elimination operation control.

In this particular configuration, when foreign material is generated in the flow path and attached to the vibrating plate in operation of the normal operation control, the sound pressure in the flow path decreases, and the decrease in the sound pressure is detected by the sound pressure sensor. Therefore, at this time, the normal operation control is shifted to the foreign material elimination operation control.

Here, return from the foreign material elimination operation control to the normal operation control may be performed at the time when the sound pressure in the flow path increases to the original value, or at the time when a predetermined period of time has elapsed after starting the foreign material elimination operation control.

In another particular configuration, since resonance frequency in the flow path changes when foreign material is generated and accumulated in the flow path in operation of the normal operation control, an impressed current for causing the vibrating plate to vibrate (for example, a current flowing to a piezoelectric element) decreases, and therefore, by detecting the decrease, the normal operation control is shifted to the foreign material elimination operation control without using a sensor. Thereafter, the foreign material elimination operation control is shifted to the normal operation control without using a sensor by detecting the restoration of the impressed current.

Also, in another particular configuration, a foreign material elimination feature eliminating a foreign material is provided on a flow path-side surface of at least any of the vibrating plate, the MEA, and a member holding the MEA. For example, on a surface of the vibrating plate opposed to the flow path, provided is a drainage mechanism at or adjacent to a position of the antinode of the vibration generated on the vibrating plate in operation of the foreign material elimination operation control.

In the case where water generated in the flow path is attached to the vibrating plate, since the water is tend to gather from a position of the node to the position of the antinode of the vibration along with the vibration of the vibrating plate, the water is efficiently eliminated by the drainage mechanism.

For example, the drainage mechanism is formed by one or more grooves recessed in the surface of the vibrating plate opposed to the flow path and extending in a direction perpendicular to the flow path, and the groove may be provided with a liquid absorber.

According to this particular configuration, liquid attached to the vibrating plate flows into the drainage mechanism and has been accumulated, and thereby eliminated from the flow path.

In a further particular configuration, the control circuit causes the vibrating plate to vibrate in a plane perpendicular to the flow path in operation of the foreign material elimination operation control.

The water attached to the vibrating plate thereby flows in the direction perpendicular to the flow path and is eliminated from the flow path.

Alternatively, as another particular configuration of the foreign material elimination feature, on the surface of the vibrating plate opposed to the flow path, provided is a dust elimination mechanism at or adjacent to the position of the node of the vibration generated on the vibrating plate in operation of the foreign material elimination operation control.

In the case where dust which has flowed into the flow path is attached to the vibrating plate, since the dust is tend to gather from the position of the antinode to the position of the node of the vibration along with the vibration of the vibrating plate, the dust is efficiently eliminated by the dust elimination mechanism.

For example, the dust elimination mechanism is formed by an adsorbing material provided on the flow path side surface of at least any of the vibrating plate, the MEA, and the member holding the MEA.

According to this particular configuration, the dust attached to the vibrating plate is captured by the adsorbing material, and eliminated from the flow path by means of change of the adsorbing material.

EFFECT OF THE INVENTION

According to the fuel cell of the present invention, by performing the foreign material elimination operation control of the gas supply device, it is possible to efficiently eliminate foreign material such as liquid or dust produced in the flow path.

BRIEF DESCRIPTION OF THE DRAWINGS

FIG. 3 are a cross-sectional view (a) of the fuel cell taken along a flow path, a plain view (b) of a vibrating plate, and a view (c) showing a vibrational state of the vibrating plate;

FIG. 12 are charts showing relations of the number of nodes, wavelength, and resonance frequency of the vibrating plate in a resonance state;

BEST MODE FOR CARRYING OUT THE INVENTION

An embodiment of the present invention is to be described in detail below with reference to the drawings.

Figure 1:
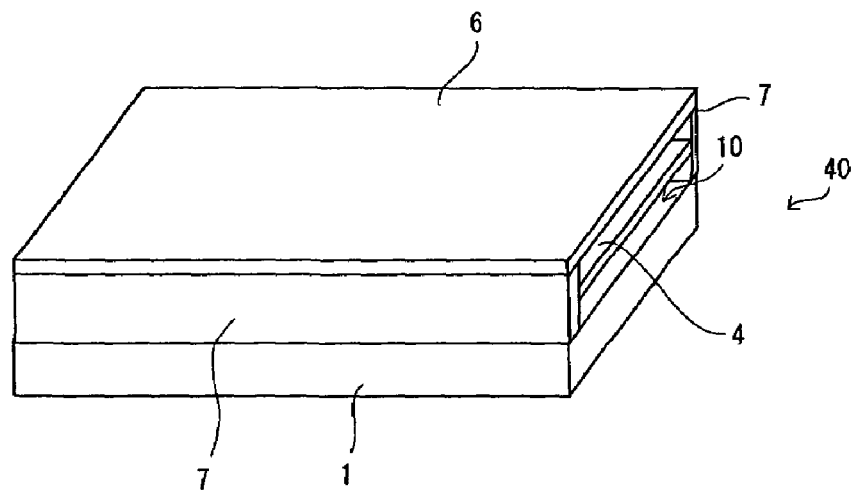
FIG. 1 is a perspective view showing an external appearance of a fuel cell of the present invention.
Figure 2:
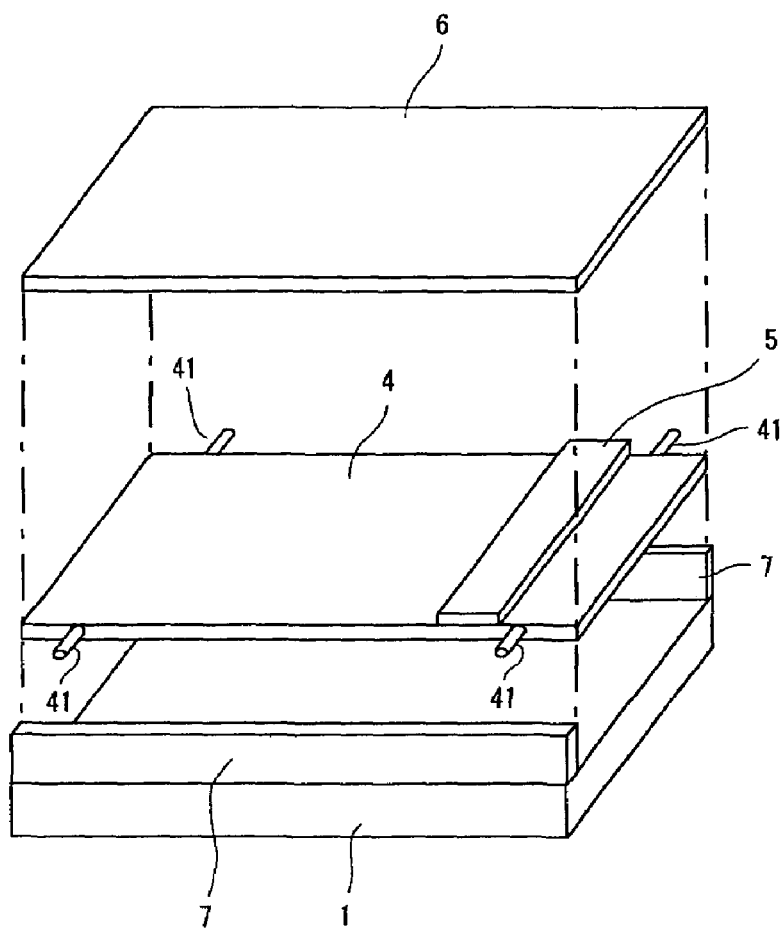
FIG. 2 is an exploded perspective view of the fuel cell.

As shown in FIGS. 1 and 2, a fuel cell of the present invention comprises an MEA 1 and an air supply device 40 for supplying air to an air pole of the MEA 1. Here, a fuel supply device for supplying fuel to a fuel pole of the MEA 1 is not shown in the figures.

The air supply device 40 comprises a vibrating plate 4 made of aluminum disposed over a surface of the MEA 1, a PZT element 5 ("C203", Fuji Ceramics Corporation product) disposed on a surface of the vibrating plate 4, a matched pair of flow path walls 7, 7 standing on both ends of the surface of the MEA 1, and a cover 6 covering the vibrating plate 4 and disposed over both the flow path walls 7, 7. An air flow path 10 is defined between the surface of the MEA 1 and the vibrating plate 4.

Also, although a part of the MEA 1 opposed to the flow path 10 works as a reflection wall to reflect acoustic wave generated from the vibrating plate 4 in this embodiment, it is also possible to adopt a structure in which the vibrating plate and a reflection plate are disposed on the surface of the MEA 1 in a direction perpendicular thereto to define the flow path 10 between the vibrating plate and the reflection plate.

In this embodiment, as shown in FIG. 2, two supporting pins 41, 41 outwardly project from both side surfaces of the vibrating plate 4 at forward and backward locations respectively. These four supporting pins 41 to 41 are coupled to the flow path walls 7, 7 to support the vibrating plate 4 (See FIG. 4).

As indicated by dotted lines in FIGS. 3(b) and 3(c), these four supporting pins 41 to 41 are disposed at locations of a front end node and a back end node of locations of a plurality of nodes (six nodes in the example in the figures) of vibration generated on the vibrating plate 4.

Figure 4:
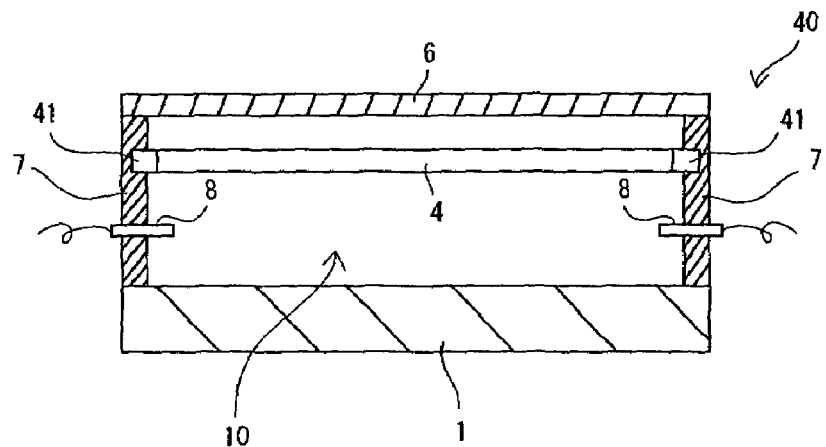
FIG. 4 is a cross-sectional view perpendicular to the flow path of the fuel cell.

Also, as shown in FIGS. 3(a) and 4, in the flow path 10, a matched pair of sound pressure sensors 8, 8 is provided at an inlet 10a and an outlet 10b thereof respectively. For the sound pressure sensor 8, it is possible to adopt a variety of known miniature sound pressure sensors such as one containing a miniature microphone, one containing a macromolecular film generating voltage along with the vibration, one containing an optical fiber sensor detecting optical refractive index, or the like.

Figure 5:
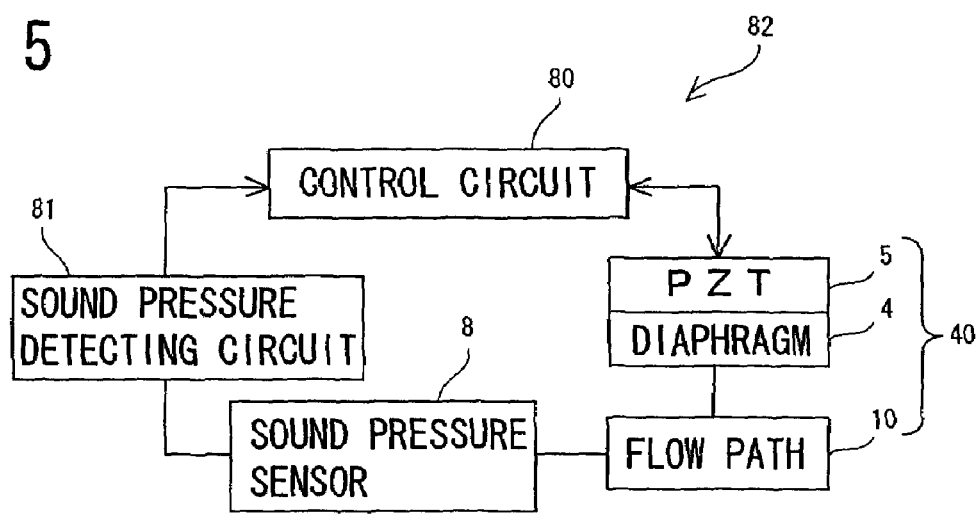
FIG. 5 is a block diagram showing a structure of a drive circuit connected to an air supply device.

As shown in FIG. 5, a control circuit 80 formed by a microcomputer is connected to the PZT element 5 constituting the air supply device 40, while a sound pressure detecting circuit 81 is connected to the sound pressure sensor 8.

Here, by applying an AC drive voltage having a predetermined frequency to the PZT element 5 from the control circuit 80, the vibrating plate 4 is driven at or around a resonance frequency. Also, the sound pressure in the flow path 10 is detected by the sound pressure detecting circuit 81, and the detected sound pressure in the flow path 10 is fed back to the control circuit 80.

Figure 6:
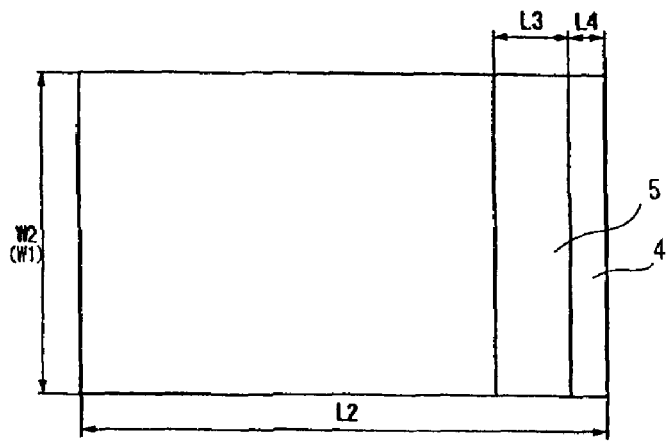
FIG. 6 is a plain view of the vibrating plate and a PZT element.
Figure 7:
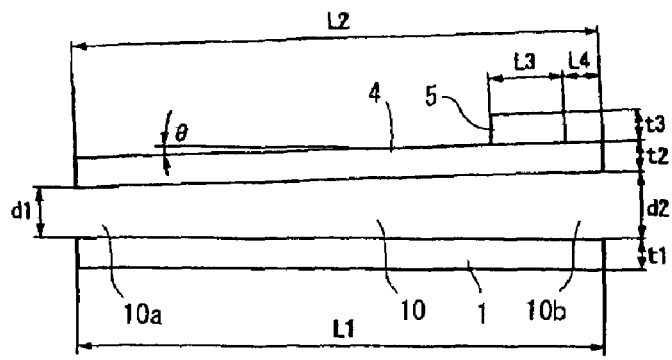
FIG. 7 is a cross-sectional view taken along the above mentioned flow path.

In particular, as shown in FIGS. 6 and 7, the reflection wall and the vibrating plate 4 of the MEA 1 has lengths L1, L2 of about 50 mm, widths W1, W2 of about 30 mm, and thicknesses t1, t2 of about 1 mm respectively. The vibrating plate 4 is disposed so that a distance between the vibrating plate 4 and the MEA 1 in a direction of the length L1, i.e. a height of the flow path 10, gradually increases, inclined at an angle θ of about 2 degrees so that the height has a distance d1 of about 2 mm on the inlet 10a side and a distance d2 of about 4 mm on the outlet 10b side.

Also, the PZT element 5 has a reed shape having a length L3 of about 3 mm, the width W2 of about 30 mm, and a thickness t3 of about 1 mm, and is disposed on the vibrating plate 4 apart from an end surface of the vibrating plate 4 on the outlet 10b side by a distance L4 of about 7 mm.

Here, the inclination angle θ is not limited to about 2 degrees and may vary depending on the shape or excitation frequency of the vibrating plate 4, and is desirable to be within a range of about 0.1 degrees to about 5 degrees. Also, it is desirable that the height of the flow path 10 is within a range of about 0.1 mm to about 5 mm.

In the fuel cell described above, when the AC drive voltage of about 70 kHz is applied to the PZT element 5, the PZT element 5 is extended and contracted in a direction of the length L3, and along with this, the vibrating plate 4 vibrates. Acoustic wave is thereby generated from the vibrating plate 4, and the acoustic wave is multiply reflected in the flow path 10 between the surface of the MEA 1 and the vibrating plate 4, thereby increasing the sound pressure in the flow path 10. As a result, the acoustic streaming is generated in the flow path 10, and a force to transfer air in the flow path 10 is generated.

Here, since the flow path 10 is formed so that an opening area on the outlet 10b side is greater than that on the inlet 10a side, air in the flow path 10 has a lower pressure loss when flowing toward the outlet 10b than flowing toward the inlet 10a. Therefore, air in the flow path 10 flows from the inlet 10a toward the outlet 10b, and along with that, air is sucked in from the inlet 10a while air is ejected from the outlet 10b.

Also, since the acoustic wave generated from the vibrating plate 4 is multiply reflected in the flow path 10, in the case where the height of the flow path 10 and the wavelength of the acoustic wave satisfy a resonance condition, the acoustic wave resonates. Here, a check of the height of the flow path 10 with which the acoustic wave resonates was performed with the vibrating plate 4 disposed in parallel with the surface of the MEA 1 and in a similar condition to the air supply device 40 described above except the varying height of the flow path 10, and found that the acoustic wave resonates in the case where the height of the flow path 10 is about 3 mm. Therefore, on a condition that the height of the flow path 10 increases in the direction of the length L1, it is assumed that the acoustic wave resonates on the inlet 10a side of the flow path 10 having the height of about 3 mm. In such a case, in an area in the flow path 10 on the inlet 10a side, standing wave of the acoustic wave is generated, thereby further increasing the sound pressure in the flow path 10 on the inlet 10a side. As a result, it is possible to more efficiently transfer air along the flow path 10 from the inlet 10a to the outlet 10b.

Further, the vibrating plate 4 can resonate in various vibration modes by changing the frequency of the AC voltage to be applied to the PZT element 5. FIG. 12(a) shows a relation of the number of nodes, wavelength, and resonance frequency in a longitudinal vibration mode in which the vibrating plate 4 resonates in a plane including a direction of the flow path 10, while FIG. 12(b) shows the relation of those in a lateral vibration mode in which the vibrating plate 4 resonates in a plane including a direction perpendicular to the flow path 10.

Figure 8:
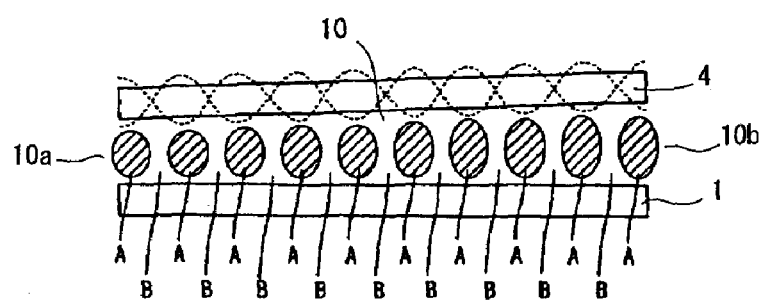
FIG. 8 is a view explaining the vibrational state of the vibrating plate and air column vibration generated in the flow path.

Thus, the vibrating plate 4 is capable to resonate at a plurality of resonance frequencies. In the case where the resonance frequency shown in FIG. 12(a) is set, as indicated by dotted lines in FIG. 8, the vibrating plate 4 resonates in the longitudinal vibration mode in which the vibrating plate 4 resonates in a plane including a direction along the flow path 10. In such a case, on the vibrating plate 4, the antinode and node of the standing wave extend in the width W2 direction and are formed in stripe shape, disposed alternately in the direction of the length L2. Since the amplitude of the vibrating plate 4 thereby increases at the position of the antinode, the sound pressure increases in the flow path 10. And then, in the flow path 10, an area A where the sound pressure is large and an area B where the sound pressure is small are disposed alternately so as to correspond to the standing wave generated on the vibrating plate 4, while as a whole, generated is a sound pressure distribution where the sound pressure decreases in a direction in which the height of the flow path 10 increases.

As a result, air is transferred in a uniform flow from the inlet 10a to the outlet 10b along the flow path 10. Here, although the amplitude of the vibrating plate 4 increases as the frequency becomes closer to the resonance frequency, the frequency within a range of about 500 Hz from the resonance frequency can vibrate the vibrating plate 4 with large amplitude, thereby generating a sufficiently large sound pressure in the flow path 10 to transfer air efficiently.

In the fuel cell described above, when the vibrating plate 4 resonates in the longitudinal vibration mode as described above and in a normal operation state in which air is transferred from the inlet 10a to the outlet 10b of the flow path 10, water is generated as by-product in the flow path 10. When accumulated in the flow path 10, the water becomes an air flow resistance, and sufficient air supply amount can not be ensured, thereby resulting in a decrease in power generation efficiency of the fuel cell.

Therefore, in the fuel cell of the present invention, at the time when water has been accumulated in the flow path 10, an operation state of the air supply device 40 is shifted from the normal operation to a drainage operation by the control circuit 80 shown in FIG. 5.

Figure 11:
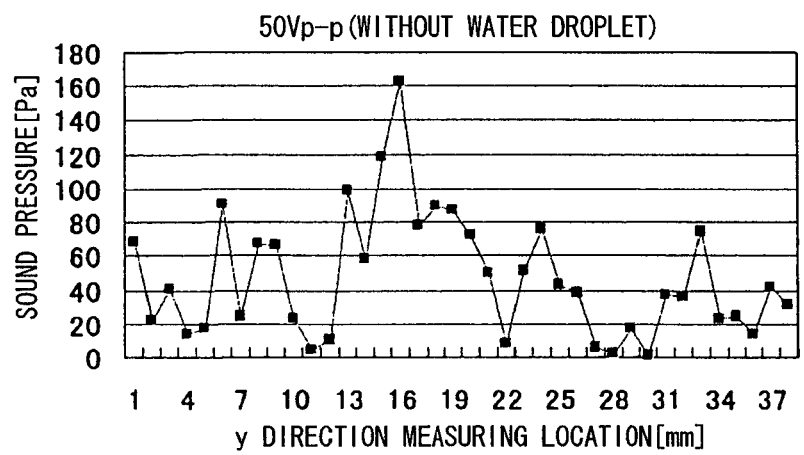
FIG. 11 are graphs comparing sound pressure distribution in the flow path based on a presence of water droplet.
Figure 11:
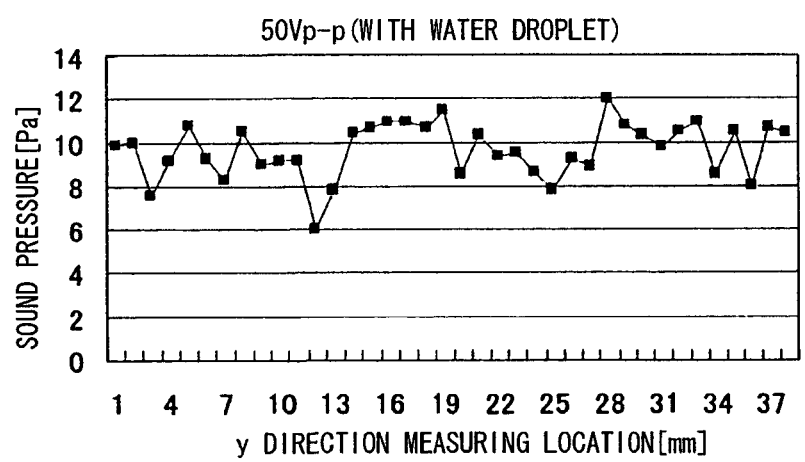

The time when water has been accumulated may be determined based on magnitude of the sound pressure in the flow path 10 detected by the sound pressure sensor 8 and the sound pressure detecting circuit 81. FIG. 11(a) shows the sound pressure distribution in a y direction along the flow path 10 in a state where no water droplet is attached to the vibrating plate 4, while FIG. 11(b) shows the sound pressure distribution in the y direction in a state where water droplet is attached to the vibrating plate 4. As shown in the figures, the sound pressure in the flow path 10 decreases significantly due to the attachment of water droplet to the vibrating plate 4. Thus, it is possible to determine that water has been accumulated in the flow path 10 when the detected sound pressure falls below a predetermined threshold.

It is also possible that three or more sound pressure sensors 8 are provided in the flow path 10 to monitor the sound pressure distribution in the flow path 10, so as to determine the time when water has been accumulated in the flow path 10.

Alternatively, when water is being accumulated in the flow path 10, the resonance frequency in the flow path 10 changes, thereby decreasing a current flowing to the PZT element 5 for vibrating the vibrating plate 4, and therefore, by detecting the decrease, it is possible to shift the normal operation control to the drainage operation control without using a sensor.

The shift from the normal operation to the drainage operation is performed by changing vibrational frequency and the amplitude of the vibrating plate 4. In the change of the vibrational frequency, from a state where the vibrating plate 4 is driven at any one of resonance frequencies shown in FIG. 12(a), the drive frequency is changed to another resonance frequency. Along with this, the numbers of nodes and antinodes change, and the positions of the nodes and antinodes change in this process.

Figure 10:
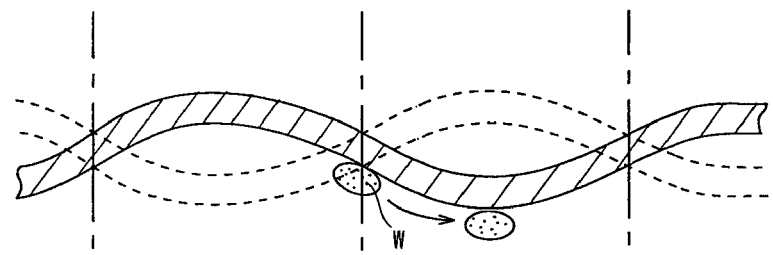
FIG. 10 are views explaining movement of water droplet attached to the vibrating plate.
Figure 10:
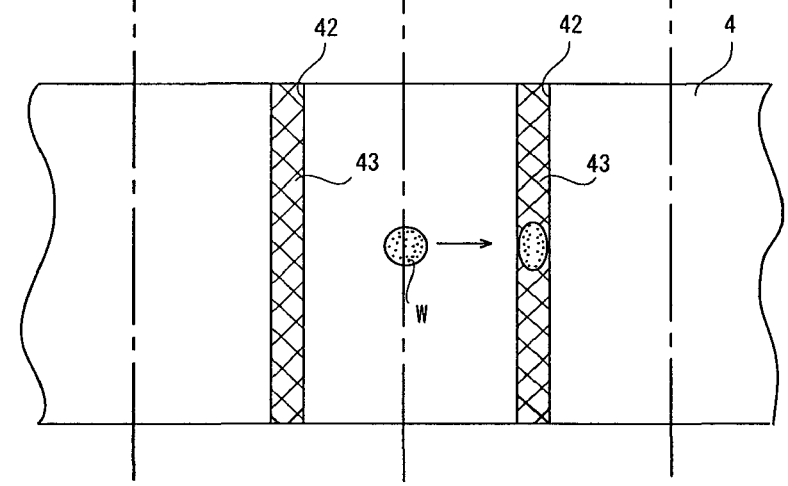

Here, since water droplet W attached to the vibrating plate 4 is tend to move from the position of the node to the position of the antinode as shown in FIG. 10(a), water gathers at the position of the antinode in the vibration after the frequency change.

Figure 9A:
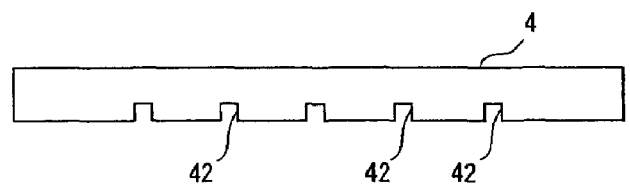
FIG. 9 are a cross-sectional view (a) and a back view (b) of the vibrating plate.
Figure 9B:
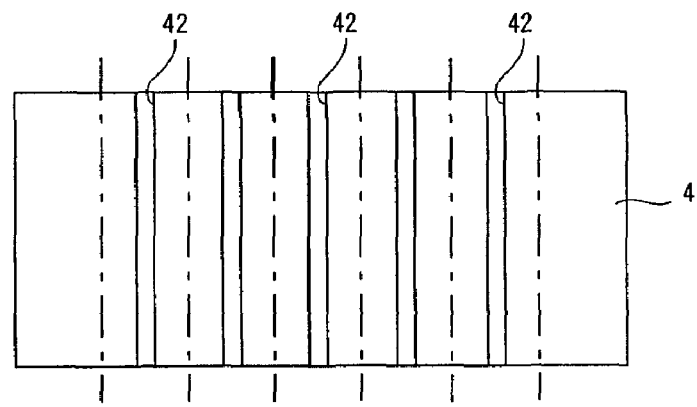

Therefore, on the surface of the vibrating plate 4 opposed to the flow path 10, as shown in FIGS. 9(a), 9(b), in the case where a plurality of grooves 42 is recessed corresponding to the position of the antinode of the positions of the node and the antinode after the frequency change indicated by dotted lines in the figure, water attached to the vibrating plate 4 moves from the position of the node to the position of the antinode to flow in the groove 42, and is drained from the flow path 10.

Also, as shown in FIG. 10(b), when a water absorbent 43 is filled in the groove 42 of the vibrating plate 4, the water droplet W can be absorbed by the water absorbent 43.

Alternatively, it is also possible to provide the water absorbent on both sides of the groove 42 so that the water in the groove 42 is absorbed by the water absorbent.

Further, the shift from the normal operation to the drainage operation may be performed by shifting the vibrational frequency of the vibrating plate 4 from the resonance frequency of the longitudinal vibration mode shown in FIG. 12(a) to the resonance frequency of the lateral vibration mode shown in FIG. 12(b).

In other words, from a state where the vibrating plate 4 is driven at any one of the plurality of resonance frequencies shown in FIG. 12(a), the vibrating plate 4 is driven at any one of a plurality of resonance frequencies shown in FIG. 12(b). The vibrating plate 4 is thereby shifted to a resonant state in a plane perpendicular to the direction of the flow path 10 (the lateral vibration mode), and water droplet attached to the position of the node at the time moves in the direction perpendicular to the flow path 10. And then, water is drained from the flow path 10 by, for example, a drainage mechanism (not shown) such as the water absorbent or the like provided on the flow path walls 7, 7 shown in FIG. 4.

Thereafter, at the time when water in the flow path 10 has been drained from the flow path 10 by the drainage operation, the drainage operation mode is shifted to the normal operation mode.

The time when water in the flow path 10 has been drained from the flow path 10 may be determined at the time when the sound pressure in the flow path 10 increases to the original value. Also, it is possible to determine that water in the flow path 10 has been drained from the flow path 10 at the time when a predetermined period of time has elapsed after starting the drainage operation.

Alternatively, it is possible, by detecting the restoration of the current flowing to the PZT element 5, to shift the drainage operation mode to the normal operation mode without using a sensor.

Also, in the fuel cell of the present invention, in the case where dust enters to or is generated in the flow path 10 and is accumulated in the flow path 10, it is possible to eliminate such dust.

In other words, at the time when dust has been accumulated in the flow path 10, the operation state of the air supply device 40 is shifted from the normal operation to a dust elimination operation by the control circuit 80. The time when dust has been accumulated in the flow path 10 may be determined based on the magnitude of the sound pressure in the flow path 10 detected by the sound pressure sensor 8 and the sound pressure detecting circuit 81.

The shift from the normal operation to the dust elimination operation is performed by changing the vibrational frequency and the amplitude of the vibrating plate 4. In the change of the vibrational frequency, from the state where the vibrating plate 4 is driven at any resonance frequency, the drive frequency is changed to another resonance frequency. Along with this, the numbers of nodes and antinodes of the vibration change. In this process, the positions of the nodes and the antinodes move.

Figure 13A:
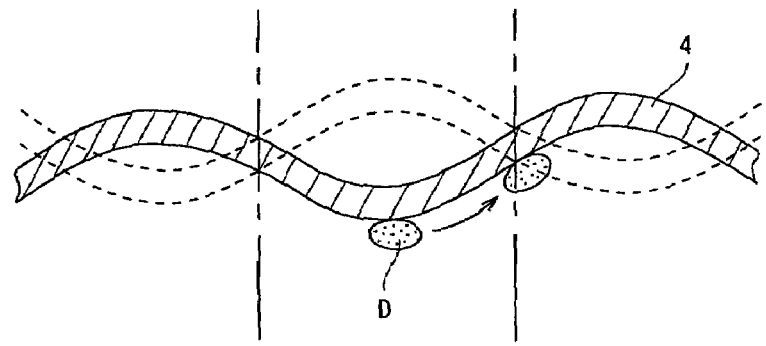
FIG. 13 are views explaining movement of dust attached to the vibrating plate.
Figure 13B:
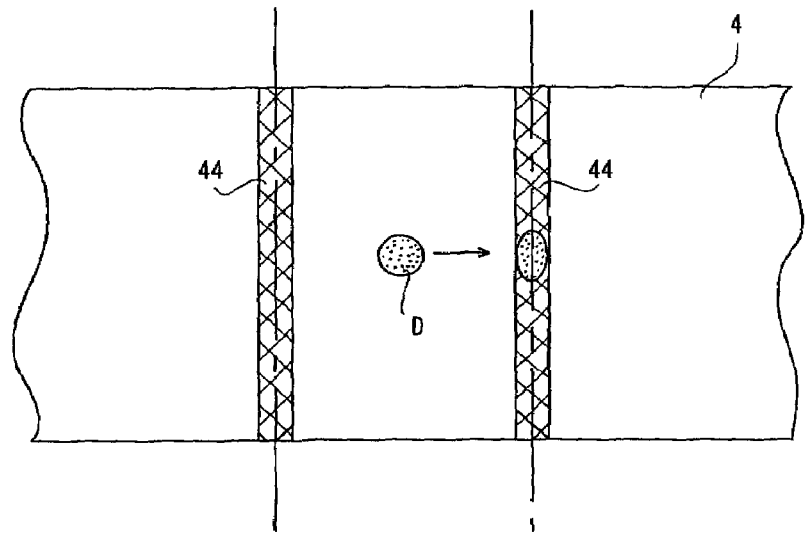
Figure 14:
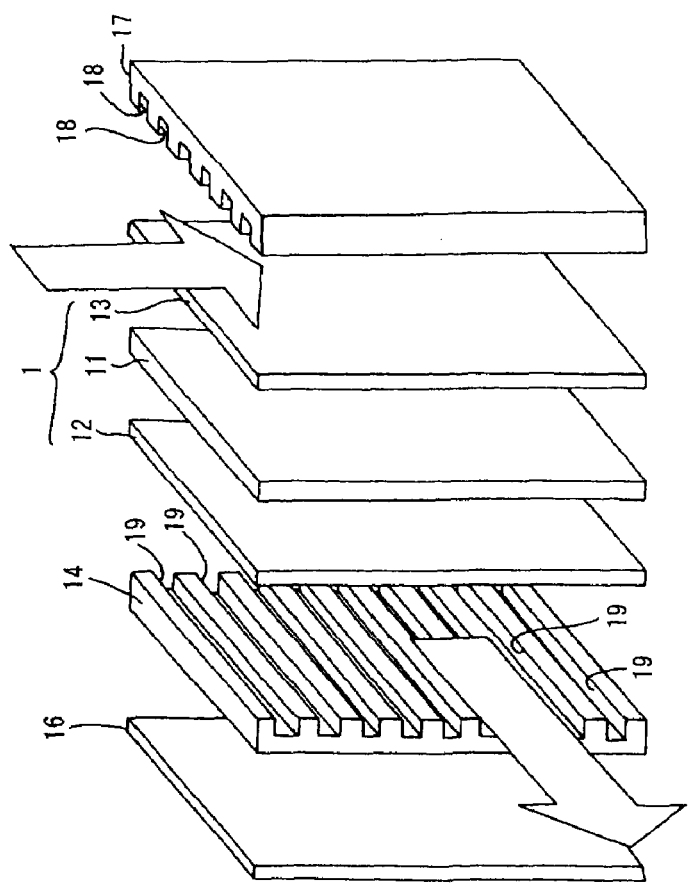
FIG. 14 is an exploded perspective view showing a structure of the fuel cell.
Figure 15:
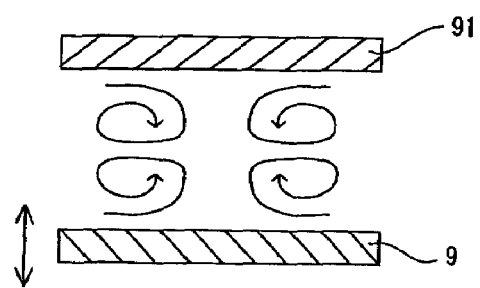
FIG. 15 is a view explaining the air column vibration generated between the vibrating plate and a reflection plate.

Here, since dust D attached to the vibrating plate 4 is tend to move from the position of the antinode to the position of the node as shown in FIG. 13(*a*), dust gathers at the position of the node in the vibration after the frequency change. Therefore, on the surface of the vibrating plate 4 opposed to the flow path 10, as shown in FIG. 13(*b*), in the case where an adsorbent 44 is provided corresponding to the position of the node of the positions of node and antinode after the frequency change indicated by dotted lines in the figure, dust attached to the vibrating plate 4 moves from the position of the antinode to the position of the node to be captured by the adsorbent 44. Here, it is also possible to provide the adsorbent 44 in the groove recessed in the vibrating plate 4.

In addition, for the adsorbent 44, it is possible to adopt a sheet having dust adsorption power such as an electrostatic film or fibriform charged sheet made of PP, PC, or PDVF material, and a sticky tape such as an adhesive film having a vinyl polymer adhesive coated surface. It is thus possible to eliminate dust by replacing a sheet which adsorbed dust with a new sheet.

According to the fuel cell of the present invention described above, since water or dust generated in the flow path 10 can be effectively eliminated, it is possible to supply a certain amount of air to the MEA 1, thereby maintaining stable power generation operation for a long time.

The structure of each part of the present invention is not limited to the above embodiment, and various modifications may be made within the technical scope set forth in the claims. For example, the groove 42 as a drainage mechanism shown in FIGS. 9(*a*), 9(*b*) may be disposed not only at the positions of the antinode of the vibration, but also between the node and antinode. Also, in the structure in which the vibrating plate 4 resonates in the lateral vibration mode in the drainage operation, the groove 42 as a drainage mechanism may be omitted.

Further, it is possible to adopt not only the structure in which it is determined that water has been accumulated in the flow path 10 when the sound pressure in the flow path 10 decreases, but also a structure in which it is determined that water has been accumulated in the flow path 10 when output current of the fuel cell decreases. Furthermore, it is possible to adopt a structure in which the sound pressure sensor 8 is omitted and the drainage operation is performed for a predetermined period of time after the normal operation is performed for a predetermined period of time.

Also, for the structure of transferring air in the flow path 10 from the inlet 10*a* to the outlet 10*b*, the structure is not limited to the structure in which the opening area on the outlet 10*b* side is greater than that on the inlet 10*a* side, but it is also possible to adopt a structure in which moment of inertia of area of the vibrating plate 4 is set greater on the outlet 10*b* side than on the inlet 10*a* side of the flow path, a structure in which elastic coefficient of the vibrating plate 4 is set greater on the outlet 10*b* side than on the inlet 10*a* side of the flow path, or a structure in which the vibrating plate 4 has an area outwardly projecting beyond the reflection wall and not opposed to the reflection wall on an end side of the flow path.

Further, the present invention may be implemented not only in the air supply device 40 supplying air to the air pole of the MEA 1 but also in a fuel supply device supplying fuel to the fuel pole of the MEA 1.

Also, the present invention may be implemented in a fuel cell of stuck type in which a plurality of MEAs are laminated or plane module type in which a plurality of MEAs are disposed planarly.

Further, instead of the structure in which the vibrating plate 4 is driven by the PZT element 5, for example, the vibrating plate may be made of piezoelectric material such as piezoelectric ceramic such as PZT, lithium tantalite ($LiTaO_3$), lithium niobate ($LiNbO_3$) and lithium tetraborate ($Li_2B_4O_7$), and crystal to directly drive the vibrating plate. Alternatively, it is possible to adopt a structure in which, in a similar manner to a SAW device to be used for a high-frequency filter or the like, a pair of comb-shaped electrodes is formed on a surface of the vibrating plate made of piezoelectric material to generate surface elastic wave on a surface of the vibrating plate opposed to the flow path.

Still further, the drainage mechanism such as the groove 42 or the water absorbent 43 of the vibrating plate 4, or the dust elimination mechanism such as the adsorbent 44 may be disposed not only on the surface of the vibrating plate 4 on the flow path 10 side, but also on a surface of the MEA 1 on the flow path 10 side or a surface of the member holding the MEA 1 on the flow path 10 side.

Here, each of the embodiments and exemplary structures described above are exemplifications in all points and should not be considered as limitation. The scope of the present invention is defined by claims, not the embodiments and explanation of exemplary structures described above, and further includes all alterations within the scope and meaning of the appended claims and equivalents.

For example, the fuel cell of the present invention may be used as a power source of all kinds of electronic devices such as a battery charger for charging a cell phone or the like, an audio-video equipment such as a video camera or the like, a portable game machine, a navigational device, a handy cleaner, a household generator, an industrial generator, a car, and a robot.

Further, the gas supply device of the present invention is not limited to the structure for use in the fuel cell, but may be applied to other uses than a power source of an electronic device described above. For example, it is also possible to eliminate foreign material in the flow path, thereby preventing a decrease in transferring ability of the cooling medium, in a structure in which the gas supply device of the present invention is provided along an electronic circuit part and a flow path surface of the electronic circuit part of an electronic device and a cooling medium is transferred by the gas supply device.

What is claimed is:

1. A fuel cell comprising a pair of electrodes disposed on both sides of an electrolyte membrane to form a membrane electrode assembly, and generating electric power by supplying fuel fluid to one of the pair of electrodes while supplying oxidation fluid to the other electrode, wherein at least one of the fuel fluid and the oxidation fluid is gas, the fuel cell comprises a gas supply device transferring the gas along a flow path defined on a surface of the membrane electrode assembly and a drive circuit driving the gas supply device, the gas supply device comprises a vibrating plate and a reflection wall on both sides of the flow path, and the drive circuit comprises
a control circuit performing a normal operation control
generating a gas flow from an inlet to an outlet of the flow path due to sound pressure gradient generated in the flow path by vibrating the vibrating plate and a foreign material elimination operation control eliminating a foreign material elimination operation control eliminating a foreign material on a surface of the vibrating plate or in the flow path by changing a vibration mode of the vibrating plate, wherein a foreign material elimination feature eliminating a foreign material is provided on a surface of at least any of the vibrating plate, the membrane electrode assembly, and a member holding the membrane electrode assembly on the flow path side, and wherein the foreign material elimination feature is a drainage mechanism eliminating liquid as foreign material, and disposed at or adjacent to a position of an antinode of vibration generated on the vibrating plate in operation of the foreign material elimination operation control.

2. The fuel cell according to claim 1, wherein the drive circuit shifts from the normal operation control to the foreign material elimination operation control by changing at least either of vibrational frequency and amplitude of the vibrating plate.

3. The fuel cell according to claim 1, wherein the drive circuit comprises a sound pressure sensor detecting sound pressure in the flow path, and when a decrease in the sound pressure is detected by the sound pressure sensor, the control circuit shifts from the normal operation control to the foreign material elimination operation control.

4. The fuel cell according to claim 1, wherein when the control circuit detects a change in resonance frequency in the flow path in operation of the normal operation control, the control circuit shifts from the normal operation control to the foreign material elimination operation control.

5. The fuel cell according to claim 1, wherein in operation of the foreign material elimination operation control, the control circuit causes the vibrating plate to vibrate in a plane perpendicular to the flow path.

6. A fuel cell comprising a pair of electrodes disposed on both sides of an electrolyte membrane to form a membrane electrode assembly, and generating electric power by supplying fuel fluid to one of the pair of electrodes while supplying oxidation fluid to the other electrode, wherein at least one of the fuel fluid and the oxidation fluid is gas, the fuel cell comprises a gas supply device transferring the gas along a flow path defined on a surface of the membrane electrode assembly and a drive circuit driving the gas supply device, the gas supply device comprises a vibrating plate and a reflection wall on both sides of the flow path, and the drive circuit comprises a control circuit performing a normal operation control generating a gas flow from an inlet to an outlet of the flow path due to sound pressure gradient generated in the flow path by vibrating the vibrating plate and a foreign material elimination operation control eliminating a foreign material on a surface of the vibrating plate or in the flow path by changing a vibration mode of the vibrating plate, wherein a foreign material elimination feature eliminating a foreign material is provided on a surface of at least any of the vibrating plate, the membrane electrode assembly, and a member holding the membrane electrode assembly on the flow path side, and wherein the foreign material elimination feature is a dust elimination mechanism eliminating dust as foreign material, and is provided at or adjacent to a position of a node of the vibration generated on the vibrating plate in operation of the foreign material elimination operation control.

7. The fuel cell according to claim 6, wherein the drive circuit shifts from the normal operation control to the foreign material elimination operation control by changing at least either of vibrational frequency and amplitude of the vibrating plate.

8. The fuel cell according to claim 6, wherein the drive circuit comprises sound pressure sensor detecting sound pressure in the flow path, and when a decrease in the sound pressure is detected by the sound pressure sensor, the control circuit shifts from the normal operation control to the foreign material elimination operation control.

9. The fuel cell according to claim 6, wherein when the control circuit detects a change in resonance frequency in the flow path in operation of the normal operation control, the control circuit shifts from the normal operation control to the foreign material elimination operation control.

* * * * *